Patented Mar. 4, 1947

2,416,945

UNITED STATES PATENT OFFICE 2,416,945

METHOD OF CONCENTRATING COFFEE

Harry A. Noyes, Watertown, Mass.

No Drawing. Application October 2, 1945,
Serial No. 619,898

3 Claims. (Cl. 99—71)

The present invention has for its object to produce a concentrated liquid extract of roasted coffee berries capable of being converted by dilution to a condition suitable for a beverage. This object is accomplished by a procedure embodying the generic characteristics of that disclosed in my prior application Serial No. 354,253, filed August 26, 1940, on which Patent No. 2,395,498 was granted February 26, 1946, entitled Treating plant products, and including modifications of one or more of the steps of such procedure not specifically described in the said application. The present application is therefore a continuation in part of the said prior application.

By way of disclosing the principles of the invention I will first describe in detail the steps of one procedure which I have followed and by which I have succeeded in developing from a coffee infusion of customary potable strength a concentrate having a largely multiplied proportional content of soluble solid matter in solution. It should be noted, however, that this specific example is not to be taken as a limitation of the protection which I claim to the specific details of procedure and numerical values stated therein.

In the example referred to, I made an infusion or extract of coffee by causing hot water to percolate through a quantity of ground roasted coffee berries. This infusion contained solid matter in solution amounting to about ¾ of 1% (.75%) by volume. I placed a quantity of this infusion in a container and froze it solid by thermal contact with a refrigerant. The freezing point of the solution is approximately 31° F., but I continued the heat extraction until the temperature was considerably below that at which the properties of a liquid ceased to be evident in the frozen mass, and until the ice formation was close grained, hard and flinty. I then raised the temperature of the mass by allowing heat to enter it at a slow rate such that the effects of heat were distributed substantially uniformly throughout the mass and with small accretions of heat, but without allowing any part of the mass to be raised up to the melting point of pure ice.

When the temperature of the mass was raised, a little at a time and with long periods of rest between successive accretions of heat, to a point between 29° F. and 31° F., the ice structure rearranged itself into the form of sheets or flakes of slight thickness and wide area, somewhat resembling in appearance disintegrating sheets of mica. During and subsequent to this rearrangement of crystals, and while the solid ice remained below 31° F. in temperature, liquid was released between the crystals and collected at the bottom of a deep hole which had previously been cut into the frozen block from the top thereof. This liquid contained from 12% to 15% of solids in solution. The amount of liquid thus accumulated in the course of a few hours contained approximately 80% of all the soluble solids contained in the original infusion.

The essential characteristics of the invention thus exemplified comprise lowering the mass of frozen infusion to a temperature substantially lower than that which suffices to freeze it solid, and thereafter allowing the mass to warm up to the temperature at which scale-like crystals form, and without heating any part of the mass to a temperature high enough to melt pure ice. The rearrangement of crystals caused by absorption of heat at temperatures in the range between 29° and 31° causes separation from the ice of a highly concentrated fraction of the infusion of which the content of solids in solution is from 15 to 20 or more times the content of solids in the original solution. This liquid concentrate is withdrawn from the ice for use, after dilution with water, as a beverage, and for other purposes.

The concentrate, not having been heated at any time, contains all the desirable aromatic and flavoring compounds of the coffee which are lost by ordinary methods of concentration by evaporation. Hence the concentrate, when diluted to the strength desirable for beverage coffee, has qualities equal to those of freshly made beverage coffee.

The initial infusion may be made by any of the methods and means now known and used for making coffee and, according to the quantity of water used in proportion to the ground coffee, may be stronger or weaker than the infusion described in the foregoing illustrative example. In any case the concentrate resulting from the freezing and subsequent treatment of the frozen mass results in a 15 to 20 times greater concentration of the coffee extractives in solution.

In the freezing step, the low point to which the temperature of the frozen body of coffee infusion is carried after solidification is not a limiting factor except in that it must be low enough to cause the mass to be crystallized in such manner that the change of crystalline structure to the sheet or scale-like form, previously described, will occur on raising the temperature of the mass to near the melting point of ice. That is, the chilling of the mass may be carried to a temperature as low as 0° F. or stopped at any point lower than about 20° F.

A new product results from this method, which is a concentrated liquid aqueous solution in which substantially all the dissolved substances of freshly made coffee infusion are contained, and the content of soluble solids is in the range from approximately 12% to approximately 15%.

What I claim is:

1. The method of producing a liquid coffee concentrate, which comprises making an infusion by intimate contact of hot water with ground coffee, freezing a quantity of such infusion to solid condition with lowering of its temperature substantially below its freezing point, then adding heat to the frozen mass at temperatures always below the freezing point of water, at a rate such that the effects of heat are distributed substantially uniformly throughout the mass and with gradual accretions of heat until a scale-like arrangement of crystals develops and liquid separates therefrom, and drawing off the separated liquid.

2. The method of making a concentrated liquid solution of coffee extractives, which comprises withdrawing heat from a body of fresh coffee infusion until such body is frozen solid and chilled to a hard, dense, crystalline mass, then adding heat gradually to such mass so that the effects of the added heat are substantially uniformly distributed throughout the mass and the temperature is raised to a point between 29° F. and 31° F., allowing the mass to stand without further rise of temperature until a scale-like formation of crystals develops and liquid is liberated, and withdrawing the liberated liquid from the spaces between the scale-like crystal formations.

3. The method of making a concentrated coffee extract which comprises withdrawing heat from a body of fresh coffee infusion until such body is frozen solid and further chilled to a temperature at least as low as approximately 20° F., then adding heat to the frozen mass at intervals and in quantities such that the temperature of the mass is raised a few degrees with each heat addition, allowing the mass to rest at substantially uniform temperature for extended periods of time between successive heat additions, continuing such alternate heat additions and rest periods until the temperature of the mass has reached a point between 29° F. and 31° F., and causing the temperature of the mass to remain within the last named range until liquid has separated from the solid parts of the mass.

HARRY A. NOYES.

REFERENCES CITED

The following references are of record in the file of this patent:

UNITED STATES PATENTS

| Number | Name | Date |
| --- | --- | --- |
| 1,507,410 | Zorn | Sept. 2, 1924 |